UNITED STATES PATENT OFFICE.

GEORGE E. NOYES, OF WASHINGTON, DISTRICT OF COLUMBIA.

IMPROVEMENT IN THE MANUFACTURE OF FERTILIZERS FROM NIGHT-SOIL.

Specification forming part of Letters Patent No. 151,905, dated June 9, 1864; appli ation filed May 23, 1874.

*To all whom it may concern:*

Be it known that I, GEORGE E. NOYES, of Washington, in the county of Washington and District of Columbia, have invented a new and valuable Improvement in Fertilizers; and I do hereby declare that the following is a full, clear, and exact description of the construction and operation of the same.

My invention has relation to the preparation of night-soil for use as a fertilizer; and consists in the novel method hereinafter described of rapidly converting such matter into solid and deodorized bricks or lumps, by the mixture therewith of hydraulic cement or calcined plaster, as set forth.

I take a quantity of night-soil and mix with it thoroughly such an amount of finely-pulverized hydraulic cement as will absorb the fluids thereof. In about ten minutes after said compost is formed, I separate the mass into bricks or lumps with an ordinary shovel or other suitable means, and in about one hour, more or less, I find it sufficiently hard to be stored or piled away. These bricks or lumps are thus formed into stone, and when desirable to do so, are ground into powder.

I find also that calcined plaster will serve as a good substitute for hydraulic cement, and I sometimes unite them in forming the compost.

By using a small amount of sulphuric acid in forming the compost, very much of the ammonia of the night-soil may be prevented from escaping, as it will combine with such ammonia and form a sulphate thereof. I therefore sprinkle a small quantity of sulphuric acid upon the compost while the process of mixing is being carried on.

What I claim as new, and desire to secure by Letters Patent, is—

The method herein described of preparing night-soil for use as a fertilizer, by the mixture of hydraulic cement or calcined plaster and sulphuric acid, to form solid bricks or lumps, substantially as specified.

In testimony that I claim the above I have hereunto subscribed my name in the presence of two witnesses.

GEORGE E. NOYES.

Witnesses:
GEORGE E. UPHAM,
ROBERT EVERETT.